US006892053B2

(12) United States Patent
Engström

(10) Patent No.: US 6,892,053 B2
(45) Date of Patent: May 10, 2005

(54) BIT ERROR ESTIMATES FROM PILOT SIGNALS

(75) Inventor: Bo Engström, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 714 days.

(21) Appl. No.: 09/726,515

(22) Filed: Dec. 1, 2000

(65) Prior Publication Data

US 2001/0036812 A1 Nov. 1, 2001

Related U.S. Application Data

(60) Provisional application No. 60/168,302, filed on Dec. 1, 1999.

(51) Int. Cl.⁷ .............................. H04B 1/00; H04B 15/00
(52) U.S. Cl. ................ 455/63.1; 455/67.11; 455/67.16; 455/450; 455/464; 455/68; 370/332; 370/333; 370/335; 370/342; 370/441; 375/148; 375/224; 375/227
(58) Field of Search ............................. 455/63.1, 67.11, 455/67.16, 450, 68, 464; 370/342, 332, 333, 441, 335, 252; 375/141, 136, 147, 148, 150, 224, 227

(56) References Cited

U.S. PATENT DOCUMENTS

| 5,329,547 | A | | 7/1994 | Ling |
|---|---|---|---|---|
| 5,692,015 | A | * | 11/1997 | Higashi et al. ............. 375/340 |
| 5,905,946 | A | * | 5/1999 | Lilleberg et al. ........... 455/63.1 |
| 6,097,711 | A | * | 8/2000 | Okawa et al. .............. 370/335 |
| 6,208,632 | B1 | * | 3/2001 | Kowalski et al. ........... 370/335 |
| 6,240,099 | B1 | * | 5/2001 | Lim et al. ................... 370/441 |
| 6,263,029 | B1 | * | 7/2001 | Alard et al. ................. 375/340 |
| 6,411,649 | B1 | * | 6/2002 | Arslan et al. ............... 375/232 |
| 6,414,988 | B1 | * | 7/2002 | Ling ........................... 375/150 |
| 6,452,917 | B1 | * | 9/2002 | Leung ........................ 370/342 |
| 6,470,044 | B1 | * | 10/2002 | Kowalski .................... 375/148 |
| 6,507,602 | B1 | * | 1/2003 | Dent .......................... 375/142 |
| 6,535,502 | B1 | * | 3/2003 | Brink ......................... 370/345 |
| 6,542,562 | B1 | * | 4/2003 | Ostberg et al. ............. 375/350 |

OTHER PUBLICATIONS

XP–000790175, Sadayuki Abeta et al.—Performance Comparison between Time–Multiplexed Channel and parallel Pilot Channel for Coherent Rake Combining in DS–CDMA Mobile Radio; IEICE Transactions on Communications, vol. E81–B, No. 7, Jul. 1998, pp. 1417–1425.

XP–000790186, Hidehiro Andoh et al.—Channel Estimation Filter Using Time–Multiplexed Pilot Channel for Coherent RAKE Combining in DS–CDMA Mobile Radio; IEICE Transactions on Communications, vol. E81–B, No. 7, Jul. 1998, pp. 1517–1525.

* cited by examiner

Primary Examiner—Marceau Milord

(57) ABSTRACT

Bit error rate estimates are used for measuring link quality in a radio telecommunications system. Unbiased, raw bit error estimates are produced from existing pilot symbols. The bit error rate estimates may be generated without incurring extra signaling overhead. More particularly, an estimation of link quality is obtained by receiving control signals in a radio receiver, where each control signal may include one or more pilot symbols deriving a channel estimate for each control signal, modifying each channel estimate as a function of the corresponding control signal's contribution to the channel estimate, and deriving a link quality measure based on said modified channel estimates.

10 Claims, 6 Drawing Sheets

BIT ERROR ESTIMATES FROM PILOT SIGNALS

This application claims priority under 35 USC 119 and/or 365 to Provisional Patent Application 60/168,302 filed in United States on Dec. 1, 1999; the entire content of which is hereby incorporated by reference.

BACKGROUND OF THE INVENTION

1. Field of the Invention

The present invention relates to the field of radio telecommunications. More particularly, the present invention relates to calculating bit error rate estimates from control signals, including, but not limited to pilot signals, and measuring therefrom the link quality in a radio telecommunications system.

2. Background Information

In radio telecommunications, bit error rate (BER) estimates can provide valuable link quality information. BER is actually the frequency at which bit errors occur in signals, typically during transmission over the air interface. Large BERs may have a detrimental effect on signal quality, such that reducing BER is highly desirable.

Transmission rate and BER are two factors that may be considered in determining link quality and there exists a direct relationship between these two factors. Typically, a higher transmission rate results in a higher BER. Conversely, a lower transmission rate results in a lower BER. However, in the interest of increasing both signal quality and transmission rate, lowering transmission rate to obtain a lower BER is not a desirable option.

Besides transmission rate, there are other conditions that can precipitate a high BER. Other such conditions include, for example, high interference levels, low signal strength levels, and fading.

BER estimates may be calculated in any of a number of different ways. For example, one method for estimating BER is to re-encode the output of the channel decoder and compare the re-encoded output of the channel decoder with the input to the decoder. Typically, these BER estimates are only produced during transmission periods, which may, in turn, increase transmission delay. Since certain signals are highly sensitive to transmission delay, particularly voice signals, any method that might increase transmission delay is not desirable.

Typically, telecommunications systems transmit control information in addition to data information, for example, during periods of silence on a speech link. Thus, one way to avoid the above-identified problem associated with estimating BER during transmission periods would be to use control information rather than data to estimate BER.

Control information often includes known information symbols, for example, pilot symbols. Pilot symbols are used to estimate such things as time delay, gain, and phase for each of a number of received signals associated with a given transmission channel. Together, these time delay, gain and phase estimates form what is known as the channel impulse response.

Many code division multiple access (CDMA) based systems employ RAKE receivers. CDMA is a form of spread-spectrum communication where a transmitted signal is spread over a wide frequency band within the communication channel. Generally, a RAKE receiver collects and combines the energy arriving along resolvable components of the received signal (e.g., multipath channels associated).

The signal energies from the several propagation paths as received from several fingers are combined or "raked" together by the RAKE receiver. A RAKE receiver can be employed to measure BER using, for example, control signals, such as pilot symbols.

RAKE receivers are well known to those skilled in the telecommunications art. Two articles illustrating the use of RAKE receivers in communication systems are "Performance Comparison between Time-Multiplexed Pilot Channel and Parallel Pilot Channel for Coherent RAKE Combining in DS-CDMA Mobile Radio", by Abeta et al., pages 1417–1425 (1998) and "Channel Estimation Filter Using Time-Multiplexed Pilot Channel for Coherent RAKE combining in DS-CDMA Mobile Radio" by Andoh et al., pages 1517–1525 (1998). Additionally, U.S. Pat. No. 5,329,547 entitled "Method and Apparatus for Coherent Communication in a Spread-Spectrum Communication System" discloses a method for encoding and decoding in a spread spectrum system to facilitate coherent communications.

In order to combine the energy associated with each resolveable component of a signal, the RAKE receiver must generate a channel estimate $c_i$ for each RAKE finger, as one skilled in the art and readily appreciate. The channel estimate $c_i$ for a given RAKE finger of a RAKE receiver is expressed in accordance with equation (1) below:

$$c_i = \frac{\sum_{k \in k_p} r_{i,k} a_{i,k}^*}{N_p} \quad (1)$$

where it is assumed that the symbols are grouped in slots. FIG. 1 illustrates an exemplary slot 104. As shown, slot 104 includes a portion 102 that contains one or more pilot symbols $r_{i,j}$ and a data portion 103, where the position of a pilot symbol $r_{i,j}$ within slot i is denoted by j, wherein $N_p$ represents the number of pilot symbols in portion 102 of slot i, and wherein $k_p$ represents the number of positions j allocated for those symbols within portion 102 of slot i. In equation (1), $a^*_{i,k}$ represents the complex conjugate operator associated with the transmitted pilot symbol $r_{i,k}$i. The bit sequence associated with the channel estimate $c_i$ can then be compared to a known bit sequence. The BER can be derived based on this comparison.

There are disadvantages associated with deriving BER using control signal information such as pilot symbols. Particularly, when a received pilot symbol is used for both channel estimation and for BER estimation, the BER estimate is biased. Biasing occurs when there is a systemic deviation or variation of a value from a reference value. The reason for this is that part of the channel estimate which originates from the symbol causes a real, positive fractional component of the transmitted symbol to be added to the estimate of the received symbol when the received symbol is corrected to account for the influence of the channel. Accordingly, BER is underestimated and therefore it does not accurately reflect the true BER.

Equation (2) represents a relationship that may be used to derive the estimated contribution of pilot symbol $r_{ij}$ for the channel estimate associated with the one RAKE finger, where $w_c$ is a real, positive weighting factor associated with the previous channel estimates C, and $w_{i,j}$ is a real, positive weighting factor for the channel estimate $c_i$.

$$\hat{a}_{i,j} = r_{i,j} \frac{(w_{i,j}c_i + w_c C)^*}{w_{i,j} + w_c} \quad (2)$$

Equation (3) demonstrates how the received symbol contribution $\hat{a}_{i,j}$, associated with a given RAKE receiver finger, for the $j^{th}$ symbol in slot i, may be estimated. Those skilled in the art will appreciate that equation (3) may be derived by substituting equation (1) into equation (2).

$$\hat{a}_{i,j} = r_{i,j} \frac{\left(w_{i,j}\left(\sum_{k \in p} r_{i,k} a_{i,k}^*\right) / N_p + w_c C\right)^*}{w_{i,j} + w_c} \quad (3)$$

When the $j^{th}$ symbol contributes to the channel estimate, the bias can be isolated and the bias contribution estimated. This is shown by the second term, $(r_{i,j}r^*_{i,j}a_{i,j})(w_{i,j}/N_p)/(w_{i,j}+w_c)$, in equation (4) below.

$$\hat{a}_{i,j} = r_{i,j} \frac{\left(w_{i,j}\left(\sum_{k \in p, k \neq j} r_{i,k} a_{i,k}^*\right) / N_p + w_c C\right)^*}{w_{i,j} + w_c} + (r_{i,j}r^*_{i,j}a_{i,j})\frac{w_{i,j}/N_p}{w_{i,j}+w_c} \quad (4)$$

As indicated, the transmitted symbol $a_{i,j}$ in the second term of equation (3) is multiplied by a real, positive factor, as the receive symbol $r_{i,j}$ the only complex valued factor, is multiplied by its own complex conjugate.

Despite the removal of the bias, there remains additional disadvantages. If the above channel estimate is computed based on only one pilot symbol, and without any averaging with previous estimates, the first term of equation (4) will be equal to (0). This computation also makes it possible to use channel estimation for decoding of adjacent symbols. However, the demodulated pilot symbol the channel estimate is based on will always have the same phase shift as the transmitted pilot symbol.

In another case, the channel estimate is computed based on more than one pilot symbol or averaging over previous estimates, every pilot symbol is affected by the channel estimate contributions of the other pilot symbols. The problem is then reduced, but not eliminated. It would be useful to develop a method that accurately determines BER and link quality and overcomes some of the disadvantages mentioned above.

SUMMARY OF THE INVENTION

The present invention involves generating BER estimates. The BER estimates are used for measuring link quality in a radio telecommunications system. More specifically, the present invention produces unbiased, raw bit error estimates from control signals, such as pilot symbols.

It is one objective of the present invention to generate the bit error estimates without incurring extra signaling overhead.

It is one objective of the present invention to provide more accurate BER estimation and consequently improve link quality.

It is another objective of the present invention to provide a more accurate channel estimation method.

In accordance with a first exemplary embodiment, a method for estimating link quality in a radio telecommunications system is provided. Control signals are received and a channel estimate is derived for each control signal. The contribution of each control signal to the channel estimate is calculated. Each channel estimate is modified as a function of the corresponding control signal's contribution to the channel estimate. A link quality measure is derived based on said modified channel estimates In accordance with a second exemplary embodiment an apparatus for estimating link quality in a radio telecommunications system using pilot symbols is provided. A means for transmitting a number of known pilot symbols to a radio receiver in a radio telecommunications system and a means for calculating a separate channel estimate for each pilot symbol based on the number of transmitted pilot symbols. For each channel estimate, a contribution associated with its corresponding pilot symbol is calculated. A means for adjusting each channel estimate by subtracting from each channel estimate, the contribution associated with the corresponding pilot symbol. A link quality measure is derived that is based on the adjusted channel estimate.

BRIEF DESCRIPTION OF THE DRAWINGS

The present invention is illustrated by way of example, and not by way of limitation, by the accompanying drawings in which like reference numerals refer to similar elements, and in which.

DETAILED DESCRIPTION OF THE INVENTION

The present invention involves measuring link quality in a radio telecommunications system. In general, link quality is measured by deriving a channel estimate for a channel over which a telecommunication signal is transmitted to a radio receiver, where the telecommunication signal typically comprises a control signal portion and a data signal portion. The channel estimate is then modified as a function of the control signal's contribution to the channel estimate. The link quality measurement is then derived based on the modified channel estimate.

Figure 1:
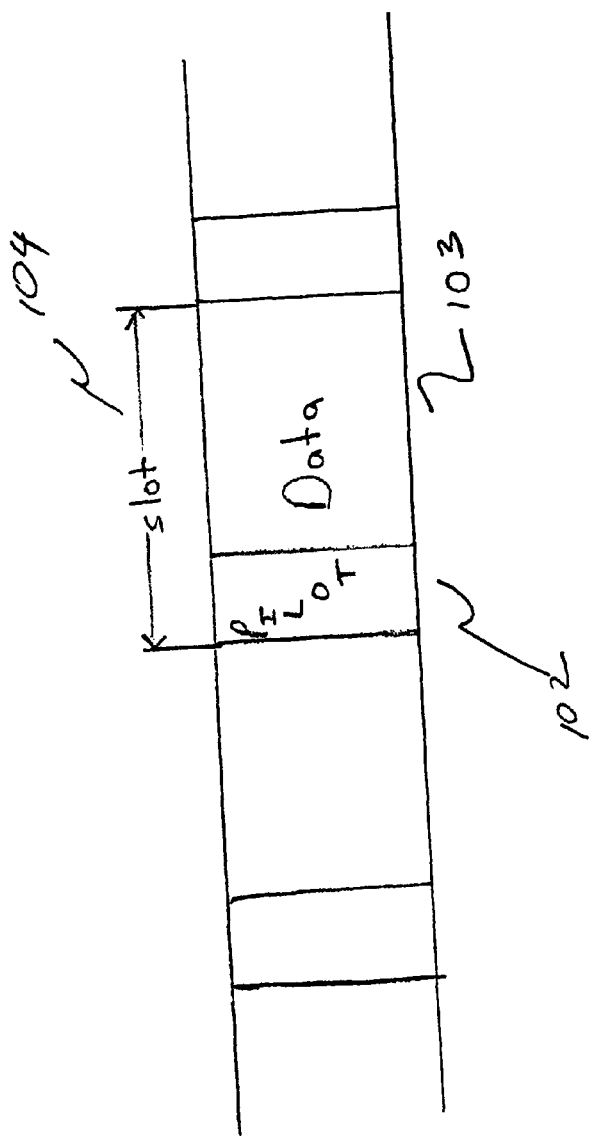
FIG. 1 is an illustration of an exemplary data slot including a pilot symbol.
Figure 2:
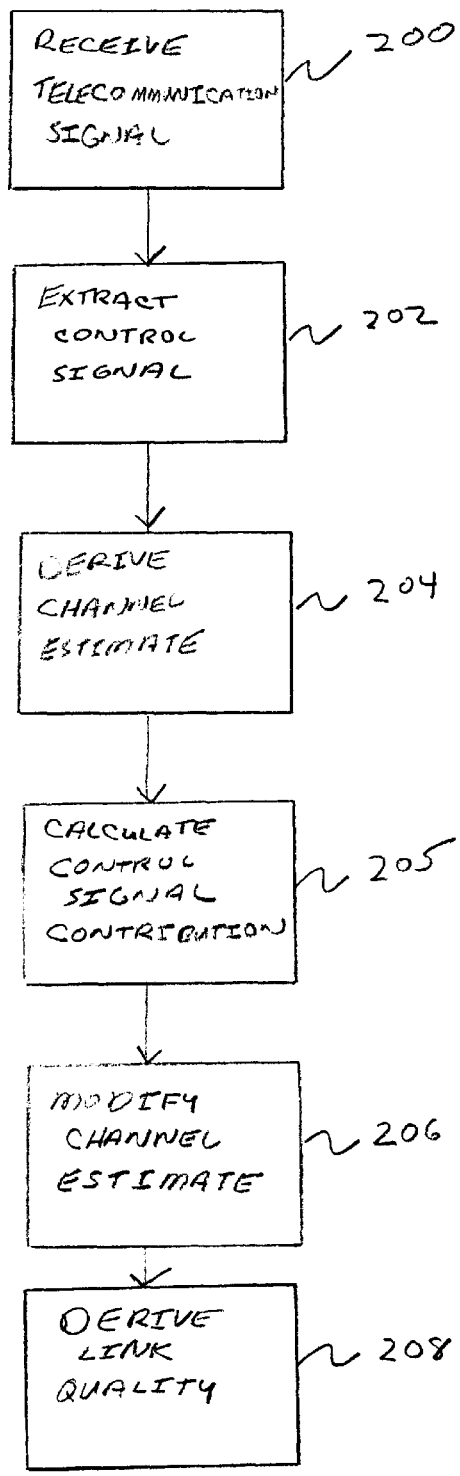
FIG. 2 is a flowchart illustrating a process for deriving link quality from a received control signal in accordance with one exemplary embodiment of the present invention.

FIG. 2 is a flowchart illustrating a technique for deriving the link quality associated with a telecommunication link. In step 200 of FIG. 2, a telecommunication signal is received at the receiver associated with the telecommunications link. In step 202 the control signal portion of the telecommunication signal is extracted.

In step 204 of FIG. 2, a channel estimate is derived for the received signal. There are many known techniques for achieving channel estimation. One channel estimation technique is to weigh the different contributions of various signal elements on a telecommunication signal. An effective channel estimation process should accurately reflect how much or how greatly the various signal contribution effects are affecting the data transmission of the telecommunications signal. Those skilled in the art will appreciate that the channel estimation step may include the process of removing other signal components that may distort the telecommunication signal.

In step 205, the contribution of the control signal portion to the channel estimate is calculated. In step 206, a channel estimate is modified as a function of the control signal contribution to the channel estimate.

In accordance with step 208, a link quality measure is then derived based upon the modified channel estimate. Link quality is a measure of how good or robust a link is. As one skilled in the art will appreciate, link quality may be measured in terms of one or more link quality parameters, such as BER, signal-to-noise ratio and latency.

Figure 3:
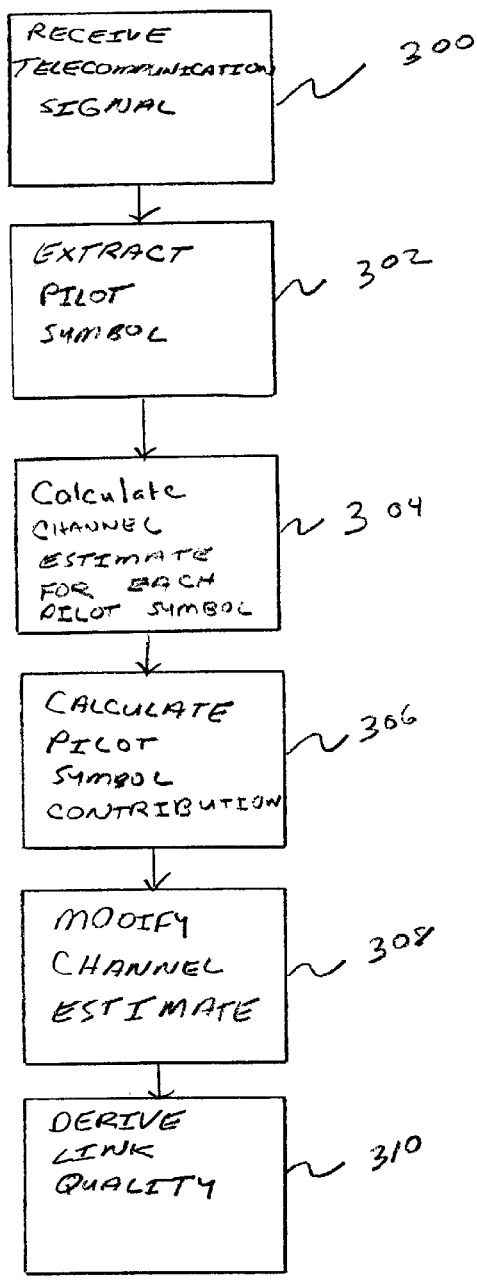
FIG. 3 is a flowchart illustrating a process for deriving link quality from a received control signal known as a pilot symbols in accordance with another exemplary embodiment of the present invention.

FIG. 3 is a flowchart illustrating a technique for deriving the link quality associated with a telecommunications link, wherein the channel estimate is based on one or more pilot symbols. In step 300, a telecommunication signal is received. In step 302, the bit values associated with the one or more pilot symbols are extracted from the radio telecommunications signal. In step 304, a channel estimate is obtained for each pilot symbol based upon the transmitted pilot symbols. In step 306, for each channel estimate that was obtained in step 304, the contribution of the corresponding pilot symbol to the channel estimate is calculated.

In accordance with step 308 of FIG. 3, the contribution of each pilot symbol is subtracted from the corresponding channel estimate. Then, in accordance with step 310, link quality is measured based on the channel estimates that have been modified by the contribution associated with the corresponding pilot symbols.

Figure 4:
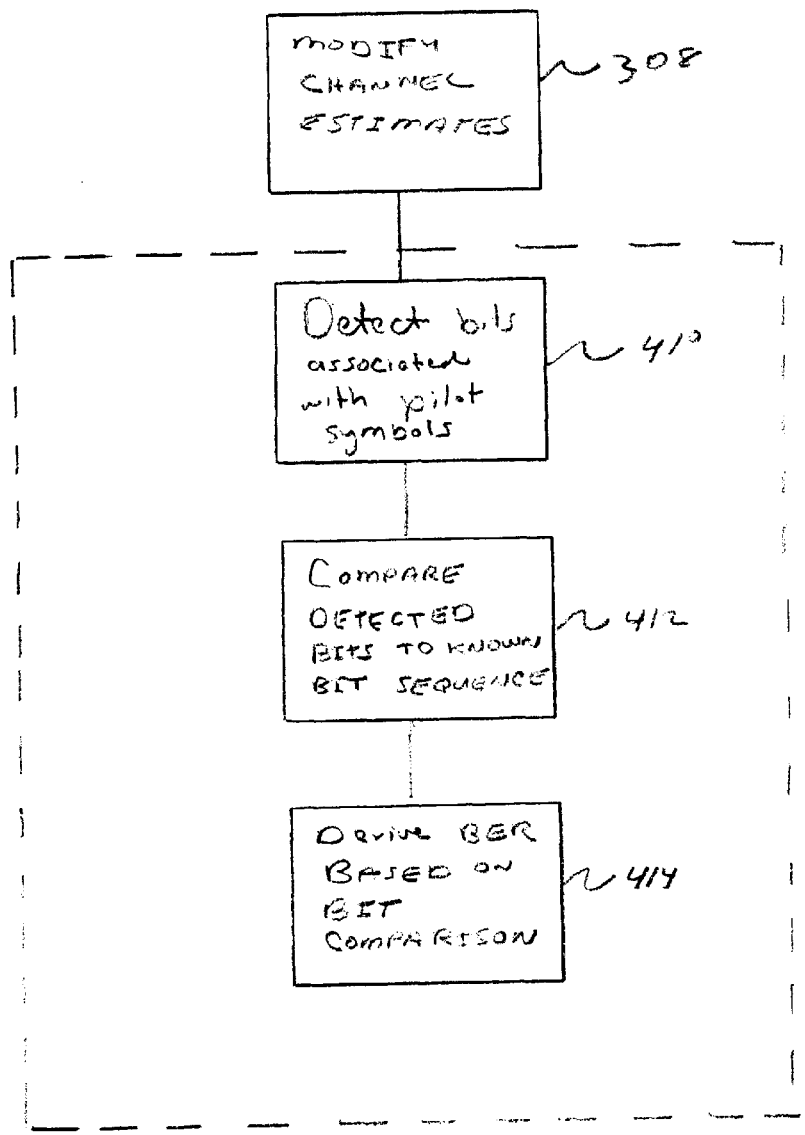
FIG. 4 is a flowchart illustrating a process for deriving BER in accordance with another exemplary embodiment of the present invention.

As mentioned earlier, BER is one of several important factors contributing to link quality. FIG. 4 is a flowchart that illustrates an exemplary technique for deriving link quality in accordance with step 310. As shown in FIG. 4, step 410, the channel estimates derived in step 308 are used to derive a sequence of bits associated with the one or more pilot symbols. In step 412, this bit sequence is compared to a known bit sequence that serves as a reference baseline for comparison purposes. Link quality in terms of a BER is then determined based on the comparison between the bit sequences.

Figure 5:
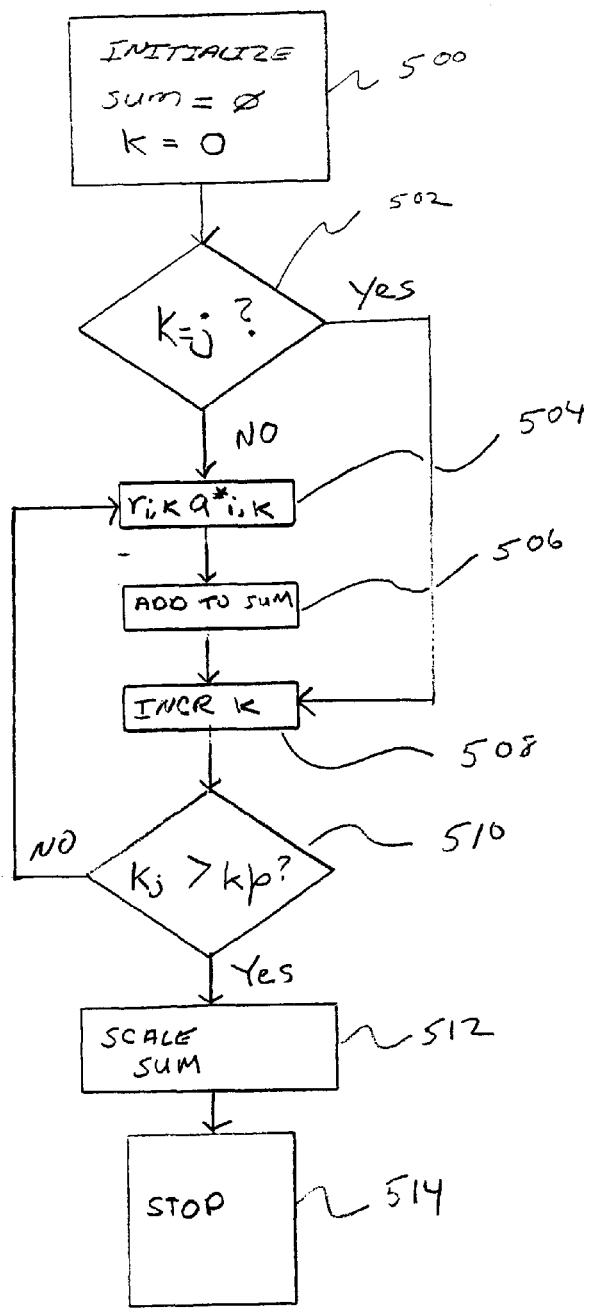
FIG. 5 is a flowchart illustrating a process for deriving a modified channel estimate base upon an original channel estimate and a correction term.

FIG. 5 is a flowchart illustrating a particular technique for deriving a channel estimate (step 304) for each of a number of pilot symbols in accordance with an exemplary embodiment of the present invention. As shown in step 500, a variable k and a variable SUM are initialized. The variable k represents the positions associated with the various pilot symbols in slot i. The variable SUM represents the summation of the multiplication products between the pilot symbols and their corresponding complex conjugate operators, as explained below.

In step 502, a determination is made as to whether the variable k is equal to a variable j, where j represents the position of a particular pilot symbol in slot i. If the variable k equals the variable j, in accordance with the YES path out of step 502, the process moves ahead to step 508 without deriving a multiplication product between the pilot symbol and the complex conjugate operator associated with position k=j. If, however, the variable k does not equal the value j in accordance with the NO path of step 502, the process proceeds to step 504.

In step 504, the pilot symbol $r_{i,k}$ is multiplied by the corresponding complex conjugate operator $a^*_{i,k}$. In accordance with step 506, the product is then added to the variable SUM. The variable k is then incremented in accordance with step 508, and a determination is made in accordance with decision step 510 as to whether the variable k is greater than the variable $k_p$.

If the variable k is less than or equal to the variable $k_p$, in accordance with the NO path out of decision step 510, a multiplication product is derived for the next pilot symbol and its corresponding conjugate operator in accordance with step 504. However, if the variable k is greater than the variable $k_p$, in accordance with the YES path out of decision step 510, the process proceeds to step 512, wherein the variable SUM is scaled by a factor of $1/(N_p-1)$.

The technique illustrated in the flowchart of FIG. 5 may be implemented in accordance with the relationship presented in equation (5) below.

$$c'_{i,j} = \frac{\sum_{k \in k_p, k \neq j} r_{i,k} a^*_{i,k}}{N_p - 1} \quad (5)$$

Figure 6:
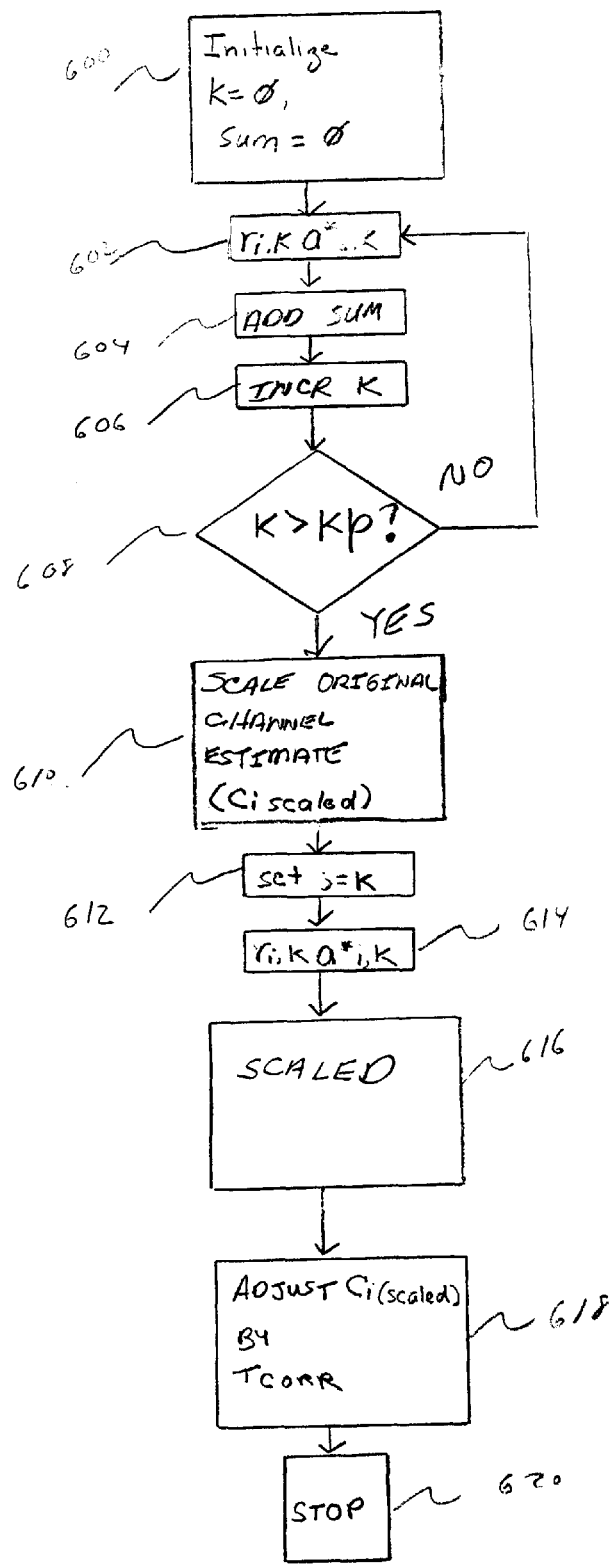

FIG. 6 is a flowchart that illustrates a technique for deriving a modified channel estimate $c'_{ij}$ (step 308) based on an original channel estimate $c_i$ and a correction term $T_{corr}$, where the correction term $T_{corr}$ is associated with a pilot symbol at position j in slot i. As shown, the variable k and the variable SUM are again initialized, in accordance with step 600. The multiplication product between the pilot symbol $r_{i,k}$ and the complex conjugate operator $a^*_{i,k}$ associated with position k in slot i is then derived as shown in step 602. In accordance with step 604, the multiplication product between the pilot symbol $r_{i,k}$ and the complex conjugate operator $a^*_{i,k}$ associated with position k in slot i is added to the variable SUM. The variable k is then incremented, as show in step 606, and a determination as to whether the variable k is greater than the variable $k_p$, in accordance with the decision in step 608. The original channel estimate $c_i$ is now equal to the value associated with the variable SUM.

If the variable k is less than or equal to the variable $k_p$, the multiplication product between the pilot symbol and the complex conjugate operator associated with the next position in slot i, as shown in step 602. However, if the variable k is greater than the variable $k_p$, in accordance with the YES path out of decision step 608, the original channel estimate $c_i$ is scaled by a factor of $N_p/(N_p-1)$, in accordance with step 610.

In step 612, the variable k is set equal to the variable j. Then, in accordance with step 614 the multiplication product between the pilot symbol and the complex conjugate operator associated with the position j is derived. The multiplication product is then scaled by a factor of $1/(N_p-1)$ to derive the correction term $T_{corr}$, as shown in step 616. The modified channel estimate $c'_{ij}$ is then derived by subtracting the correction term $T_{corr}$ from the scaled, original channel estimate $c_{i(scaled)}$, in accordance with step 618.

The technique illustrated in the flowchart of FIG. 6 may be implemented in accordance with the relationship presented in equation (6) below.

$$c'_{i,j} = \frac{c_i N_p}{N_p - 1} - \frac{r_{i,j} a^*_{i,j}}{N_p - 1} \quad (6)$$

When the modified channel estimate is used to demodulate an unbiased pilot symbol, equation (7) shows how the original channel estimate $c_i$ may be used to compute a first estimate of the received symbol, and how the bias is subtracted therefrom. It will be noted that the first estimate of the received symbol is represented by the first term in equation (7), while the bias is represented by the second term in equation (7).

$$\hat{a}'_{i,j} = r_{i,j} \frac{(w_{i,j} c_i N_p/(N_p - 1) + w_c C)^*}{w_{i,j} + w_c} - \quad (7)$$
$$(r_{i,j} r^*_{i,j} a_{i,j}) \frac{w_{i,j}/(N_p - 1)}{w_{i,j} + w_c}$$

In equation (7), the channel estimate for a given RAKE finger of a RAKE receiver is calculated as a function of the following variables: $r_{i,j}$ is the received symbol, $w_{i,j}$ is a real, positive weighting factor for the channel estimate $c_i$, the operator "*" refers to the complex conjugate, where $w_c$ is a real, positive weighting factor associated with the previous channel estimates C, $w_{i,j}$ is a real, positive weighting factor for the channel estimate $c_i$ and a scaling factor $N_p/(N_p-1)$.

In the special instance where the pilot symbols from only one slot or data block are used for channel estimation, equation (8) is applicable, and where $w_{i,j}$ equals 1 and $w_c$ equals zero (0). In this special case, a biased, demodulated pilot symbol contribution for one RAKE receiver finger is formed in the usual way, as given by the first term of equation (8). The received symbol $r_{i,j}$ is then multiplied by the conjugate of the original channel estimate $c_i$. The unbiased channel estimate is scaled using $N_p/(N_p-1)$, due to the change in the number of demodulated pilot symbol contributions, and subtraction of the bias, where the bias is given by the second term of equation (8).

$$\hat{a}'_{i,j} = r_{i,j}(c_i N_p/(N_p-1))^* - (r_{i,j} r^*_{i,j} a_{i,j})/(N_p-1) \quad (8)$$

In another instance where multiple pilot symbols from multiple slots are used for channel estimation, averaging and interpolation algorithms can be used to assimilate the different data. Equations (9), (10) and (11) illustrate some exemplary averaging and interpolation schemes that can be used. In equation (9), for example, the channel estimate from the current slot $c_i$ is averaged with the channel estimate from the previous slot (i.e., C equals $c_{i-1}$), and where $w_{i,j}$ equals $w_c$, which equals ½.

$$\hat{a}'_{i,j} = r_{i,j} \frac{(c_i N_p/(N_p - 1) + c_{i-1})^*}{2} - (r_{i,j} r^*_{i,j} a_{i,j})/(2(N_p - 1)) \quad (9)$$

In equation (10), channel estimates are exponentially filtered to form a mean channel estimate (i.e., $C_{i+1}$ equals $(1-\alpha)C_i + \alpha C_i$), where $w_{i,j}$ equals $\alpha$, and where $w_c$ equals $1-\alpha$, $\alpha$ being the exponential filter coefficient.

$$\hat{a}'_{i,j} = r_{i,j}(\alpha c_i N_p/(N_p-1)+(1-\alpha)C_i)^* - (r_{i,j} r^*_{i,j} a_{i,j})\alpha/(N_p-1) \quad (10)$$

Finally, in equation (11), the channel estimates are interpolated according to the position of the symbols in the slot, where C equals $c_{i-1}$, $w_{i,j}$ equals $w_1 + j\Delta w$, $w_c$ equals $w_1 + (N_p - j)\Delta w$, and where $w_1$ is the interpolation start and $\Delta w$ are the increment values.

$$\hat{a}'_{i,j} = r_{i,j} \frac{((w_1 + j\Delta w) c_i N_p/(N_p - 1) + (w_1 + (N_p - j)\Delta w) c_{i-1})^*}{2w_1 + N_p \Delta w} * \quad (11)$$
$$(r_{i,j} r^*_{i,j} a_{i,j}) \frac{(w_1 + j\Delta w)/(N_p - 1)}{2w_1 + N_p \Delta w}$$

The present invention is not limited by the description and the description is provided for exemplary and explanatory purposes. The accompanying drawings are included to provide a further understanding of the invention and are incorporated in and constitute a part of this specification, illustrating one embodiment of the invention. The drawings, together with the description, serve to explain the principles of the invention and are not intended to limit the scope of the invention.

What is claimed is:

1. A method for estimating link quality in a radio telecommunications system comprising the steps of:
    receiving control signals;
    deriving a channel estimate for each control signal estimates wherein a bias associated with each control signal from the corresponding channel estimate is determined and removed;
    calculating the contribution of each control signal to the channel estimate;
    modifying each channel estimate as a function of the corresponding control signal's contribution to the channel estimate; and
    deriving a link quality measure based on said modified channel.

2. The method of claim 1, wherein said step of deriving a link quality measure based on said modified channel estimates comprises the step of: estimating a bit error rate associated with said channel estimates.

3. A method of estimating link quality in a radio telecommunications system using pilot symbols, said method comprising:
    transmitting a number of known pilot symbols to a radio receiver in the radio telecommunications system;
    calculating a channel estimate for each pilot symbol based on the number of transmitted pilot symbols;
    calculating a contribution associated with the corresponding pilot symbol for each calculated channel estimate;
    adjusting each channel estimate by subtracting the contribution associated with the corresponding pilot symbol; and
    generating a link quality measure based on the adjusted channel estimate.

4. The method of claim 3, wherein said step of generating a link quality measure based on the adjusted channel estimates comprises the steps of:
    detecting bits associated with the pilot symbols, based on the adjusted channel estimates;
    comparing the detected bits to a reference bit sequence; and
    deriving a bit error rate based on a result of said step of comparing the detected bits to the reference bit sequence.

5. The method of claim 4, wherein said adjusted channel estimates are formed separately for each pilot symbol and each one of the separate channel estimates excludes the contribution of each corresponding pilot symbol.

6. An apparatus for estimating link quality in a radio telecommunications system comprising:

means for receiving a plurality of control signals in a radio receiver; means for deriving a channel estimate for each control signal;

means for modifying each channel estimate as a function of the corresponding control signal's contribution to the channel estimate; and means for deriving a link quality measure based on said modified channel estimates, wherein said means for modifying each channel estimate as a function of the corresponding control signal's contribution to the channel estimate comprises: means for removing a bias associated with each control signal from the corresponding channel estimate.

7. The apparatus of claim 6, wherein said means for deriving a link quality measure based on said modified channel estimates comprises: means for estimating a bit error rate associated with said control symbols.

8. An apparatus for estimating link quality in a radio telecommunications system using pilot symbols, said method comprising:

means for transmitting a number of known pilot symbols to a radio receiver in said radio telecommunications system;

means for calculating a separate channel estimate for each pilot symbol based on the number of transmitted pilot symbols;

means for each channel estimate, calculating a contribution associated with its corresponding pilot symbol;

means for adjusting each channel estimate by subtracting from each channel estimate, the contribution associated with the corresponding pilot symbol; and means for generating a link quality measure based on the adjusted channel estimates.

9. The apparatus of claim 8, wherein said means for generating a link quality measure based on the adjusted channel estimates comprises:

means for detecting data bits associated with the pilot symbols, based on the adjusted channel estimates;

means for comparing the detected bits to a known bit sequence; and means for deriving a bit error rate based on the result of said step of comparing the detected bits to the known bit sequence.

10. The apparatus of claim 9, wherein said means for adjusting channel estimates are formed separately for each pilot symbol and each one of the separate channel estimates excludes the contribution of each corresponding pilot symbol.

* * * * *